(12) United States Patent
You

(10) Patent No.: US 11,110,990 B2
(45) Date of Patent: Sep. 7, 2021

(54) BRAKE SYSTEM FOR BABY OR CHILD VEHICLE

(71) Applicant: Young Bae You, Yangju-si (KR)

(72) Inventor: Young Bae You, Yangju-si (KR)

( * ) Notice: Subject to any disclaimer, the term of this patent is extended or adjusted under 35 U.S.C. 154(b) by 0 days.

(21) Appl. No.: 16/462,243

(22) PCT Filed: Nov. 22, 2016

(86) PCT No.: PCT/KR2016/013489
§ 371 (c)(1),
(2) Date: May 20, 2019

(87) PCT Pub. No.: WO2018/097342
PCT Pub. Date: May 31, 2018

(65) Prior Publication Data
US 2019/0329839 A1  Oct. 31, 2019

(51) Int. Cl.
*B62L 3/02* (2006.01)
*B62B 9/08* (2006.01)

(52) U.S. Cl.
CPC ........... *B62L 3/02* (2013.01); *B62B 9/087* (2013.01)

(58) Field of Classification Search
CPC ..... B62B 9/087; B62B 5/0461; B62B 5/0433; B62B 9/085; B62B 5/0438; B62B 9/08; B62B 5/04; B62B 5/0414; B62B 5/0457; B62B 7/044; B62B 5/0404; B62B 5/0476; B62B 9/20; B62B 5/0442; B62B 9/24; F16D 2125/60; F16D 2127/001
See application file for complete search history.

(56) References Cited

U.S. PATENT DOCUMENTS

| 2,425,574 | A | * | 8/1947 | Stewack | B62B 9/085 |
| | | | | | 188/20 |
| 4,084,663 | A | * | 4/1978 | Haley | B62B 5/04 |
| | | | | | 188/19 |
| 5,713,585 | A | * | 2/1998 | Curtis | B62B 9/085 |
| | | | | | 188/20 |
| 5,960,488 | A | * | 10/1999 | Morris | A61G 7/1005 |
| | | | | | 4/496 |

(Continued)

FOREIGN PATENT DOCUMENTS

| JP | 2017000698 A | * | 1/2017 |
| KR | 10-1998-0083898 A | | 12/1998 |

(Continued)

OTHER PUBLICATIONS

English translation of JP 2017000698a (Year: 2017).*
International Search Report for PCT/KR2016/013489 dated Aug. 23, 2017 from Korean Intellectual Property Office.

*Primary Examiner* — Bradley T King
*Assistant Examiner* — Mahbubur Rashid
(74) *Attorney, Agent, or Firm* — Revolution IP, PLLC

(57) ABSTRACT

The disclosure relates to a brake system for a baby or child vehicle, and more particularly, to a brake system for a baby or child vehicle, in which the movement of the vehicle is controlled by locking a brake while an occupant is getting off the vehicle, and automatically releasing the brake in only a case where it is checked that the occupant is getting on the vehicle, thereby preventing a falling accident caused by the movement of the vehicle when the occupant gets on or off the vehicle or while a toddler stands up on the vehicle.

5 Claims, 5 Drawing Sheets

(56) References Cited

U.S. PATENT DOCUMENTS

| | | | | |
|---|---|---|---|---|
| 6,148,942 A | * | 11/2000 | Mackert, Sr. | ............. B62B 9/00 |
| | | | | 180/65.6 |
| 6,170,615 B1 | * | 1/2001 | Cheng | ..................... B62B 9/082 |
| | | | | 188/20 |
| 6,298,949 B1 | * | 10/2001 | Yang | ..................... B62B 5/0414 |
| | | | | 188/19 |
| 9,108,658 B2 | * | 8/2015 | Spencer | .................. B62B 9/087 |
| 2003/0132612 A1 | * | 7/2003 | Pike | ......................... B62B 9/20 |
| | | | | 280/642 |
| 2005/0242548 A1 | * | 11/2005 | Hutchinson | ............. B62B 9/082 |
| | | | | 280/642 |
| 2007/0051566 A1 | * | 3/2007 | Marlow | .................... B62B 5/04 |
| | | | | 188/20 |
| 2014/0196991 A1 | * | 7/2014 | Fite | ........................ B62B 9/085 |
| | | | | 188/69 |
| 2015/0069727 A1 | * | 3/2015 | Lee | ...................... B62B 5/0414 |
| | | | | 280/47.38 |
| 2016/0076631 A1 | * | 3/2016 | Funada | ............... F16H 25/2204 |
| | | | | 74/89.4 |
| 2017/0021849 A1 | * | 1/2017 | Giampavolo | .......... A47D 13/08 |

FOREIGN PATENT DOCUMENTS

| | | |
|---|---|---|
| KR | 20-0341599 Y1 | 2/2004 |
| KR | 10-1469378 B1 | 12/2014 |
| KR | 10-2015-0029659 A | 3/2015 |
| KR | 10-2016-0118199 A | 10/2016 |
| KR | 10-2017-0000931 A | 1/2017 |

\* cited by examiner

US 11,110,990 B2

BRAKE SYSTEM FOR BABY OR CHILD VEHICLE

TECHNICAL FIELD

The disclosure relates to a brake system for a baby or child vehicle, and more particularly, to a brake system for a baby or child vehicle such as a kiddie car, a stroller, etc., in which the movement of the vehicle is controlled by locking a brake while an occupant is getting off the vehicle, and automatically releasing the brake in only a case where it is checked that the occupant is getting on the vehicle, thereby preventing a falling accident caused by the movement of the vehicle when the occupant gets on or off the vehicle or while a toddler stands up on the vehicle.

BACKGROUND ART

In general, a toddler rides a tricycle to play or move as being fastened with a safety bar for safety.

However, the safety bar protects the safety during movement only after a baby or child completely gets on a bicycle. In other words, there are problems that a baby or child who is poor at walking is likely to fall and thus negligent accidents frequently occur because the bicycle is movable forward and backward while s/he gets on the bicycle.

In addition, the bicycle is recognized as a play material for a baby or a child, and therefore the baby or child is likely to pull or lean on the bicycle even when s/he does not ride the bicycle. Because the bicycle is movable when a baby or a child pulls or leans on the bicycle, there are problems that the baby or child falls and negligent accidents frequently occur.

DISCLOSURE

Technical Problem

Accordingly, the disclosure is conceived to solve the foregoing problems, and an aspect of the disclosure is to provide a brake system for a baby or child vehicle, in which a bicycle or a stroller is immovable with a locked brake when an occupant is getting off the bicycle or stroller, and the bicycle is movable with a released brake only when the occupant is safely getting on the bicycle as being fastened with a safety bar, thereby preventing a falling accident caused by the movement of the bicycle or the stroller when a baby or a child gets on or off the bicycle or the stroller and a negligent accident caused when a baby or a child leans on the bicycle or the stroller.

Technical Solution

In accordance with an embodiment of the disclosure, there is provided a brake system for a baby or child vehicle, including: a brake formed in a wheel; a brake line connected between the brake and an operation controller; and a brake operation controller connected to the brake line and configured to control tension of the brake line to lock and release the brake, wherein the brake is ordinarily locked and the brake operation controller interworking with a safety bar operates the mechanically connected brake so that the brake can be switched over from a locked state to a released state when an occupant gets on a vehicle and fastens the safety bar.

The brake operation controller may include a pair of safety bars rotatably formed to be opened and closed; and a tension adjusting unit provided in a rotary shaft of the safety bar and configured to adjust tension of the brake based on rotation of the safety bar, and the brake may include a plurality of brake grooves formed in the wheel; and a brake guide moving forward or backward based on operation of the brake operation controller and inserted in or separated from the brake groove formed in the wheel to lock or release the brake.

The tension adjusting unit may include a rotary frame coupled to an outer circumference of the rotary shaft of the safety bar and configured to rotate along with the safety bar; and a brake line holding end formed in the rotary frame 121 and configured to hold the brake line.

The brake guide may be initially set as inserted in the brake groove when the brake line is tensioned in a direction opposite to the brake, and be moved back in a direction toward the brake line and separated from the brake groove to release the brake when the brake line is loosened.

In accordance with another embodiment of the disclosure, there is provided a brake system for the baby or child vehicle, including: a sensor configured to sense whether a safety bar is fastened; a controller configured to control a brake to be locked or released based on sensing of the sensor; and a brake configured to lock or release the wheel under control of the controller, wherein the brake is ordinarily locked and the controller operates the brake to be switched over from a locked state to a released state when the sensor senses that an occupant gets on the vehicle and fastens the safety bar.

The brake may include a plurality of brake grooves formed in the wheel; a brake guide moving forward and backward to be coupled to or separated from the brake groove; and a gear assembly controlling the brake guide to move forward and backward.

The safety bars may form a pair, and respectively include coupling units to couple with each other when positioned at a rear side of the vehicle, the coupling units being internally provided with magnets arranged to have opposite poles and coupled and held by the magnets accommodated therein when the safety bar is rotated toward the rear side of the bicycle and unfastened.

Advantageous Effects

A brake system for a baby or child vehicle according to the disclosure is immovable with a brake locked when a baby or child does not get on a bicycle, and thus prevents the bicycle from moving when the baby or child gets on the bicycle, walks using the bicycle without getting on the bicycle, or leans on the bicycle, thereby having an effect on preventing negligent accidents that the baby or child falls.

BEST MODE

A bicycle brake system for a baby or child vehicle according to the disclosure includes a brake 30 formed in a bicycle wheel, a brake line 20 connected between the brake and an operation controller, and a brake operation controller 10 connected to the brake line and adjusting the tension of the brake line to thereby lock and release the brake.

The brake 30 is ordinarily locked, and the brake operation controller interworking with a safety bar operates the mechanically connected brake so that the brake can be switched over from a locked state to a released state when an occupant gets on a bicycle and fastens the safety bar.

Modes of the Invention

Below, embodiments of the disclosure will be described in detail with reference to accompanying drawings.

Figure 1:
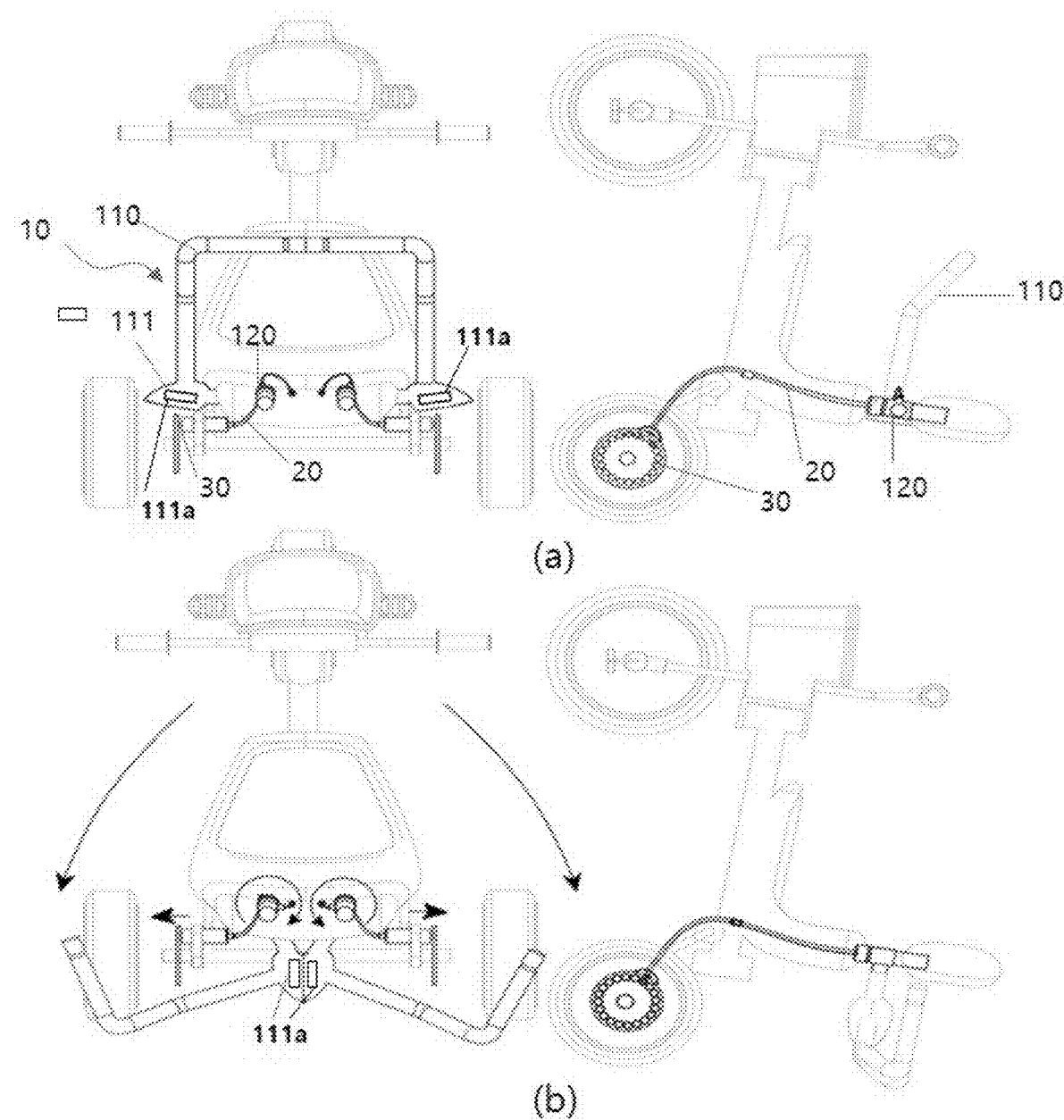
FIGS. 1 and 2 are brake operation diagrams schematically illustrating that a switching member according to an embodiment of the disclosure is provided as a safety device, i.e., a safety bar.
Figure 2:
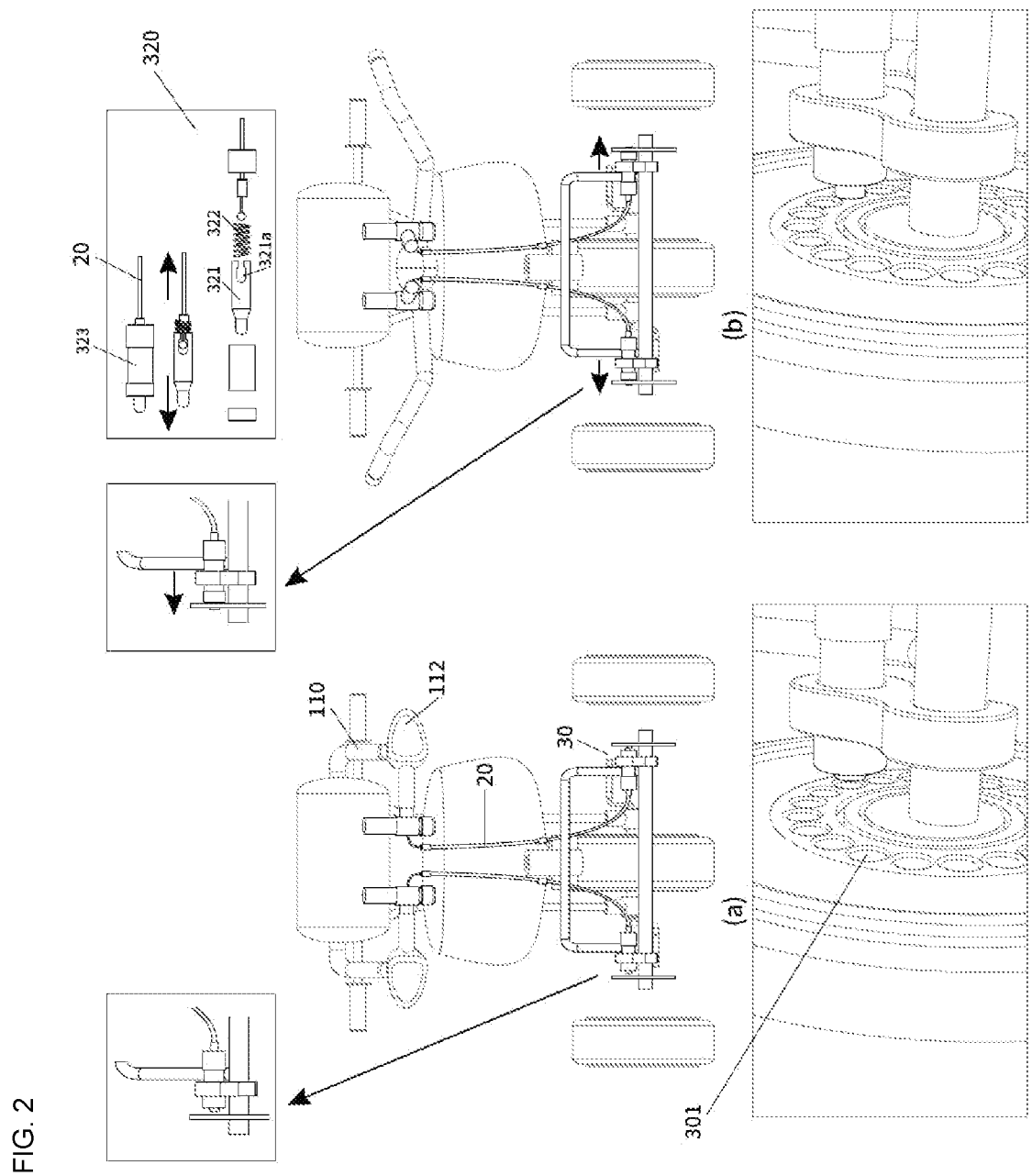
Figure 3:
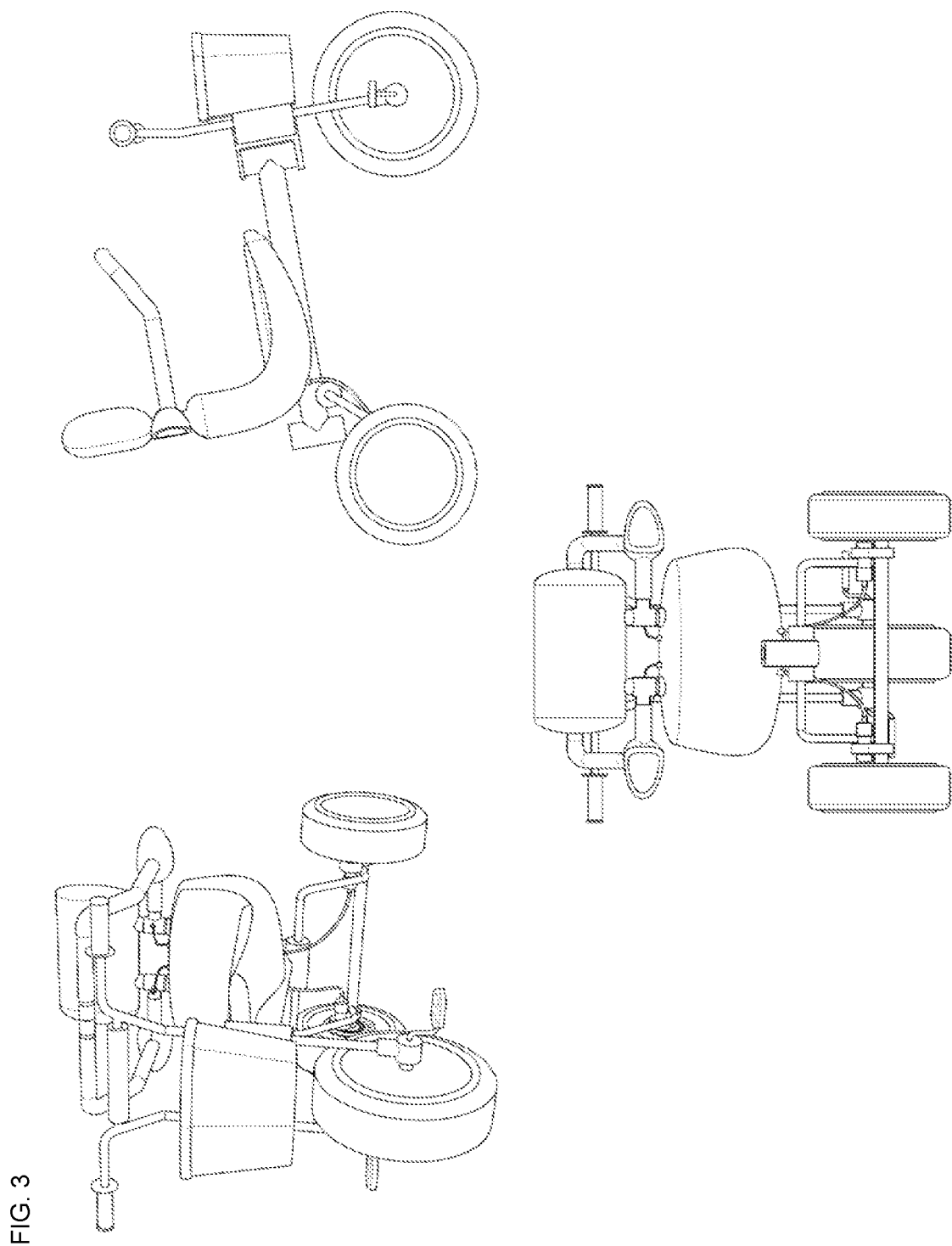
FIGS. 3 and 4 are perspective views of a bicycle, in which a brake is locked and released as the safety bar is opened and closed.
Figure 4:
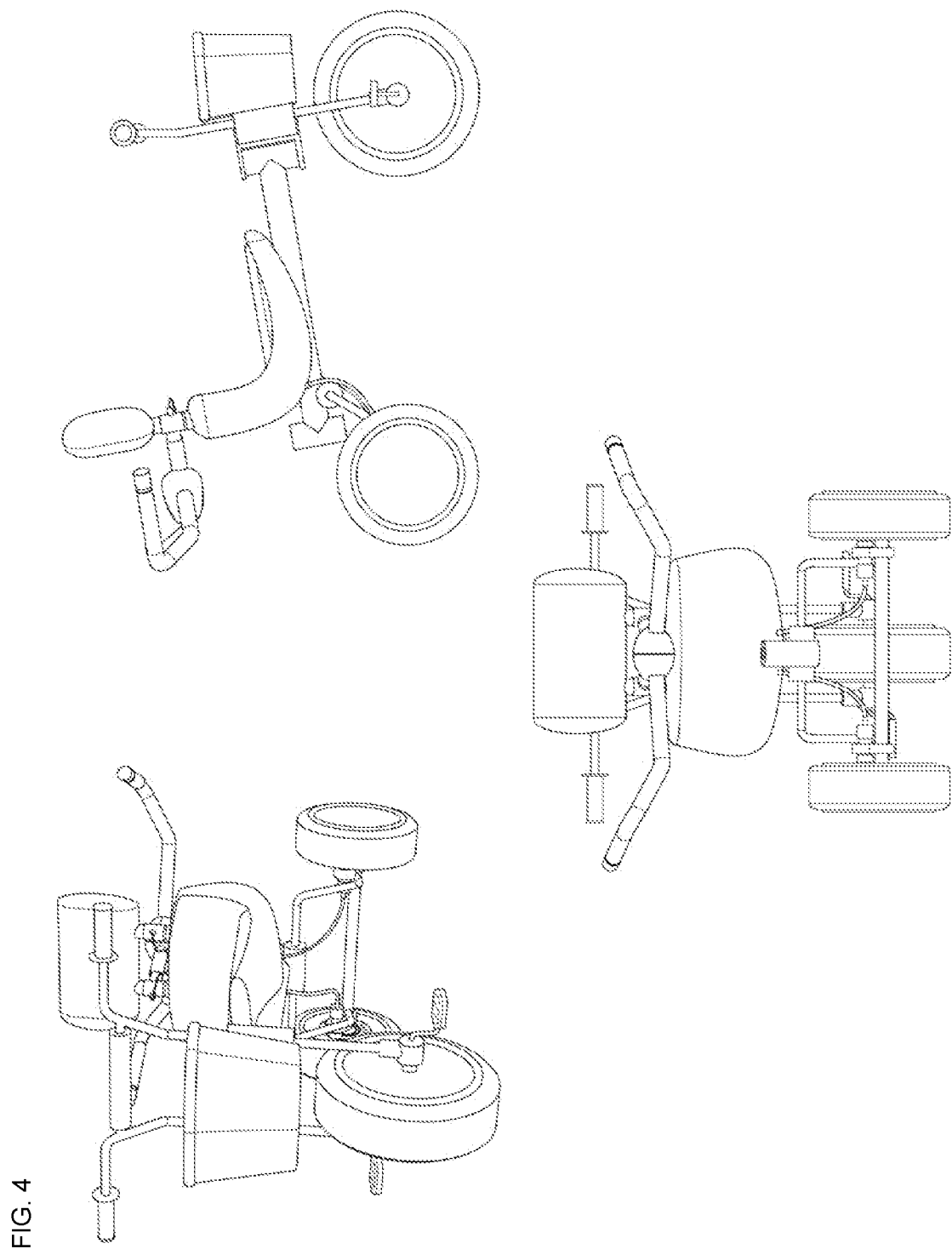

FIGS. 1 and 2 are brake operation diagrams schematically illustrating that a switching member according to an embodiment of the disclosure is provided as a safety device, i.e., a safety bar, and FIGS. 3 and 4 are perspective views of a bicycle, in which a brake is locked and released as the safety bar is opened and closed.

Referring to FIGS. 1 and 2, a brake system for a baby or child vehicle according to the disclosure may be configured to release a brake only when an occupant of the bicycle gets on the bicycle and then fastens the safety bar.

Here, the baby or child vehicle is defined to include a stroller, a bicycle, and the like as long as it has a wheel and moves as a baby or child is getting on.

The brake system for the baby or child vehicle includes a brake 30 provided in the wheel, a brake line 20 connected between the brake and an operation controller, and the brake operation controller 10 connected to the brake line and adjusting the tension of the brake line to thereby locking and releasing the brake.

The brake 30 is ordinarily locked, and the brake operation controller interworking with a safety bar operates the mechanically connected brake so that the brake can be switched over from a locked state to a released state when an occupant gets on a bicycle and fastens the safety bar.

The brake operation controller 10 includes a pair of safety bars 110 rotatably formed to be opened and closed, and a tension adjusting unit 120 provided in a rotary shaft of the safety bar and adjusting the tension of the brake in accordance with the rotation of the safety bar.

The brake 30 may include a plurality of brake grooves 310 formed in the wheel, and a brake guide 320 moving forward or backward based on operation of the brake operation controller 10 and inserted in or separated from the brake groove 310 formed in the wheel to thereby making the brake switch over between the locked state and the released state.

The brake guide 320 is initially set as inserted in the brake groove 310 when the brake line 20 is tensioned in a direction opposite to the brake, and is moved back in a direction toward the brake line and separated from the brake groove 310 to thereby release the brake when the brake line 20 is loosened.

Here, the brake guide 320 is configured in such a manner that a guide member 321 formed with a moving groove 321a and an elastic member 322 are assembled within a frame 323. Initially, when the brake line 20 is tensioned in a direction opposite to the brake, one end of the brake line 20 is initially positioned at one end of the moving groove in a direction of the brake. When the brake line 20 is loosened in the direction of the brake, one end of the brake line 20 is positioned at the other end of the moving groove in the direction opposite to the brake and the guide member is moved by elasticity of the elastic member forward, i.e. toward the brake groove 310, thereby locking the brake.

Therefore, the brake guide 320 is moved by force exerted in a direction opposite to the tension of the brake line 20.

The tension adjusting unit 120 may include a rotary frame 121 coupled to an outer appearance of the rotary shaft of the safety bar 110 and rotating along with the safety bar 110, and a brake line holding end 122 formed in the rotary frame 121 and holding the brake line 20

The brake line 20 moves in a direction opposite to a rotating direction of the safety bar 110. When the safety bar 110 is fastened by rotating from a rear side toward a front side of the bicycle, the brake line 20 is loosened by rotary force exerted in a direction opposite to the rotating direction of the safety bar and thus tensioned in the direction toward the brake.

On the other hand, when the safety bar 110 is unfastened by rotating from the front side toward the rear side of the bicycle, the brake line 20 is pulled by rotary force exerted in a direction opposite to the rotating direction of the safety bar and thus tensioned in the direction opposite to the brake.

The safety bar 110 is positioned at the rear side of the vehicle before an occupant gets on the vehicle, and is rotated toward the front side of the vehicle and fastened when the occupant gets on the vehicle.

Here, the pair of safety bars 110 may respectively include coupling units 111 to couple with each other when positioned at the rear side of the vehicle. The coupling units are internally provided with magnets 111a arranged to have opposite poles. When the safety bar is rotated toward the rear side of the bicycle and unfastened, the coupling units are coupled and held by the magnets 111a accommodated therein as shown in FIG. 4.

Below, operation of locking and releasing the brake will be described according to an embodiment of the disclosure.

First, the brake 30 is set to maintain the locked state while the safety bar 110 is not fastened. When the safety bar 110 is positioned at the rear side of the vehicle, the brake line 20 is tensioned in the direction opposite to the brake, and the brake guide 320, to which force is exerted in the direction opposite to the tension direction of the brake line, is maintained as mounted to the brake groove 310, thereby locking the brake.

Thus, the brake 30 is always locked in the state that the safety bar is unfastened, and prevents the vehicle from moving even though a baby or child pulls or leans on the vehicle without getting on the vehicle.

On the other hand, when an occupant gets on the vehicle and fastens the safety bar 110, the safety bar positioned at the rear side of the vehicle is rotated toward the front side and the tension adjusting unit 120 pulls the brake line 20. Thus, the direction of the force based on the tension of the brake line 20 is switched over from the direction opposite to the brake to the direction or the brake, and the brake guide 320, to which force is exerted in the direction opposite to the tension direction of the brake line, is moved backward and separated from the brake groove 310, thereby releasing the brake.

The brake is released and the vehicle is movable only when the safety bar 110 is fastened as an occupant gets on the vehicle. Because the safety bar 110 should be fastened to ride the bicycle, safety is secured. In addition, the brake of the vehicle is locked in the state that the safety bar 110 is not fastened. Therefore, it is possible to prevent negligent accidents that a baby or child falls, which may occur when an occupant gets on the vehicle or leans on the vehicle, e.g. the bicycle without getting on the vehicle.

The brake system for the baby or child vehicle according to the disclosure may be configured to be actuated without any motor as described above. Alternatively, the brake system may be configured to be actuated by a motor.

Figure 5:
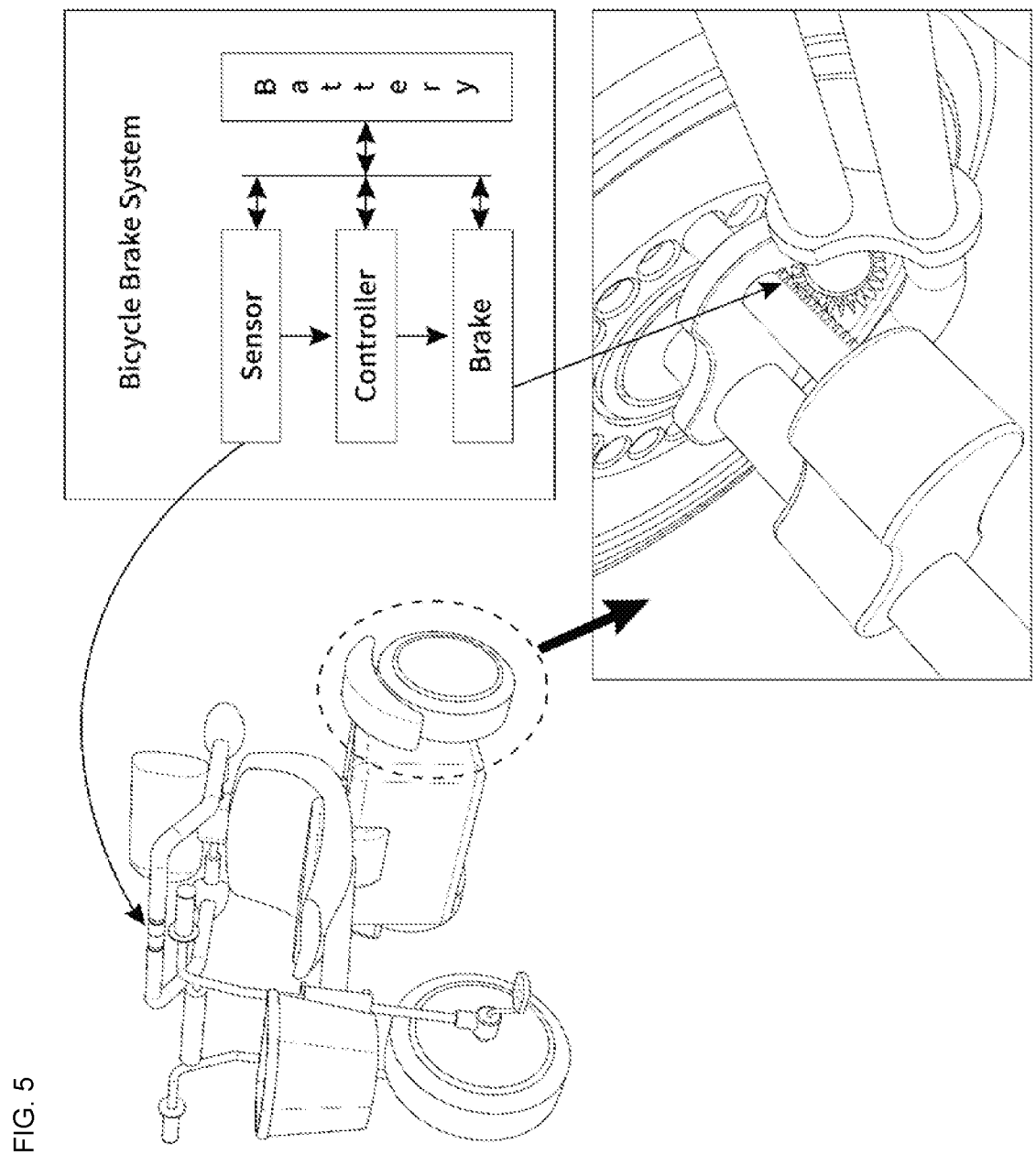
FIG. 5 illustrates a bicycle with an electromotive bicycle brake system according to an embodiment of the disclosure and its block diagram.

FIG. 5 illustrates a bicycle with an electromotive bicycle brake system according to an embodiment of the disclosure and its block diagram.

Referring to FIG. 5, the bicycle brake system according to this embodiment may include a sensor for sensing whether a safety bar is fastened, a controller for controlling a brake to be locked or released based on sensing information of the sensor, and a brake for locking or releasing the wheel under control of the controller.

The sensor may be provided in a safety bar fastening portion so as to sense only fastening of a pair of safety bars. The sensor may be actualized by any type of sensor such as a pressure sensor, an optical sensor, a touch sensor, etc. as long as it can sense the fastening of the safety bar.

The controller serves to control the brake to be locked or released based on the sensing information of the sensor.

The brake may include a plurality of brake grooves formed in the wheel, a brake guide moving forward and backward to be coupled to or separated from the brake groove, and a gear assembly controlling the brake guide to move forward and backward.

The gear assembly may be configured with a bevel gear, which transform vertical force into horizontal force as shown in FIG. 5, a worm gear, or a rack-and-pinion.

Although a few exemplary embodiments of the disclosure have been described, the scope of the disclosure is not limited to the embodiments and it will be appreciated by a person having an ordinary skill in the art various changes and modifications may be made in these embodiments without departing from the principles and spirit of the disclosure.

INDUSTRIAL APPLICABILITY

The disclosure relates to a brake system for a baby or child vehicle, and more particularly is very useful in baby goods industry because the movement of the vehicle is controlled by locking a brake while an occupant is getting off the vehicle, and automatically releasing the brake in only a case where it is checked that the occupant is getting on the vehicle, thereby preventing a falling accident caused by the movement of the vehicle when the occupant gets on or off the vehicle or while a toddler stands up on the vehicle.

The invention claimed is:

1. A brake system for a baby or child vehicle, comprising a brake formed in a wheel;
a brake line connected between the brake and a brake operation controller; and
the brake operation controller connected to the brake line and configured to control tension of the brake line to lock and release the brake,
wherein the brake is ordinarily locked and the brake operation controller interworking with a pair of safety bars operate the brake so that the brake is switched over from a locked state to a released state when an occupant gets on the baby or child vehicle and fastens the pair of safety bars, and
wherein the pair of safety bars respectively comprise coupling units to couple with each other when positioned at a rear side of the baby or child vehicle, the coupling units being internally provided with magnets arranged to have opposite poles and coupled and held by the magnets accommodated therein when the pair of safety bar are rotated toward the rear side of the baby or child vehicle and unfastened.

2. The brake system for the baby or child vehicle according to claim 1, wherein:
the brake operation controller comprises
the pair of safety bars rotatably formed to be opened and closed; and
a tension adjusting unit provided in a rotary shaft of the pair of safety bars and configured to adjust tension of the brake based on rotation of the pair of safety bars, and
the brake comprises
a plurality of brake grooves formed in the wheel; and
a brake guide moving forward or backward based on operation of the brake operation controller and inserted in or separated from one of the plurality of brake grooves formed in the wheel to lock or release the brake.

3. The brake system for the baby or child vehicle according to claim 2, wherein the tension adjusting unit comprises
a rotary frame coupled to an outer circumference of the rotary shaft of the safety bar and configured to rotate along with the safety bar; and
a brake line holding end formed in the rotary frame and configured to hold the brake line.

4. A brake system for a baby or child vehicle, comprising:
a sensor configured to sense whether a pair of safety bars are fastened;
a controller configured to control a brake to be locked or released based on sensing of the sensor; and
the brake configured to lock or release a wheel under control of the controller,
wherein the brake is ordinarily locked and the controller operates the brake to be switched over from a locked state to a released state when the sensor senses that an occupant gets on the baby or child vehicle and fastens the pair of safety bars, and
wherein the pair of safety bars respectively comprise coupling units to couple with each other when positioned at a rear side of the baby or child vehicle, the coupling units being internally provided with magnets arranged to have opposite poles and coupled and held by the magnets accommodated therein when the pair of safety bar are rotated toward the rear side of the baby or child vehicle and unfastened.

5. The brake system for the baby or child vehicle according to claim 4, wherein the brake comprises a plurality of brake grooves formed in the wheel; and
a brake guide moving forward and backward to be coupled to or separated from one of the plurality of brake grooves.

* * * * *